United States Patent [19]

Pax

[11] Patent Number: 5,495,917
[45] Date of Patent: Mar. 5, 1996

[54] LIQUID DISTRIBUTING APPARATUS FOR LUBRICATING PARTS

[75] Inventor: Steven J. Pax, Celina, Ohio

[73] Assignee: Pax Products, Inc., Celina, Ohio

[21] Appl. No.: 367,737

[22] Filed: Jan. 3, 1995

[51] Int. Cl.[6] ................................................ F16N 27/00
[52] U.S. Cl. ................. 184/7.4; 184/6; 184/29; 239/570
[58] Field of Search ................ 184/6, 7.4, 8, 29; 239/570, 571, 600; 417/313

[56] References Cited

U.S. PATENT DOCUMENTS

| | | | |
|---|---|---|---|
| 2,328,812 | 3/1942 | Klein | 184/7.4 |
| 2,521,177 | 9/1950 | Le Clair | 184/29 |
| 3,481,431 | 12/1969 | Dorsey | 184/7.4 |
| 3,891,057 | 6/1975 | Stevens | 184/7.4 |
| 4,079,864 | 3/1978 | Cox . | |
| 4,157,132 | 6/1979 | Kramer | 184/7.4 |
| 4,520,902 | 6/1985 | Snow | 184/7.4 |
| 5,002,230 | 3/1991 | Norskov | 239/570 |
| 5,038,893 | 8/1991 | Willner et al. | 184/7.4 |
| 5,249,930 | 10/1993 | Pacquesi | 417/313 |
| 5,285,871 | 2/1994 | Sievenpiper | 184/7.4 |
| 5,311,968 | 5/1994 | Pingel | 184/7.4 |

FOREIGN PATENT DOCUMENTS

| | | | |
|---|---|---|---|
| 6408723 | 9/1965 | Netherlands | 239/571 |

*Primary Examiner*—Thomas E. Denion
*Attorney, Agent, or Firm*—Jacox, Meckstroth & Jenkins

[57] ABSTRACT

A solenoid actuated air control valve and a plurality of liquid distribution pumps are mounted on a common elongated manifold having passages for supplying pressurized air and lubricating fluid to the pumps in response to actuation of the solenoid valve. Each of the distribution pumps has an air actuated reciprocating piston, and lubricating fluid is supplied to the manifold and distribution pumps through a line connected to a supply pump also having an air actuated reciprocating diaphragm or piston. The solenoid valve controls the supply pump in timed relation with the distribution pumps, and the supply pump is located within an annular filter unit submerged within a reservoir of lubricating fluid. Each distribution pump is connected by a flexible line to a corresponding spray nozzle having a check valve including a tubular plastic insert which confines a spring bias ball and a resilient annular seat for the ball.

24 Claims, 3 Drawing Sheets

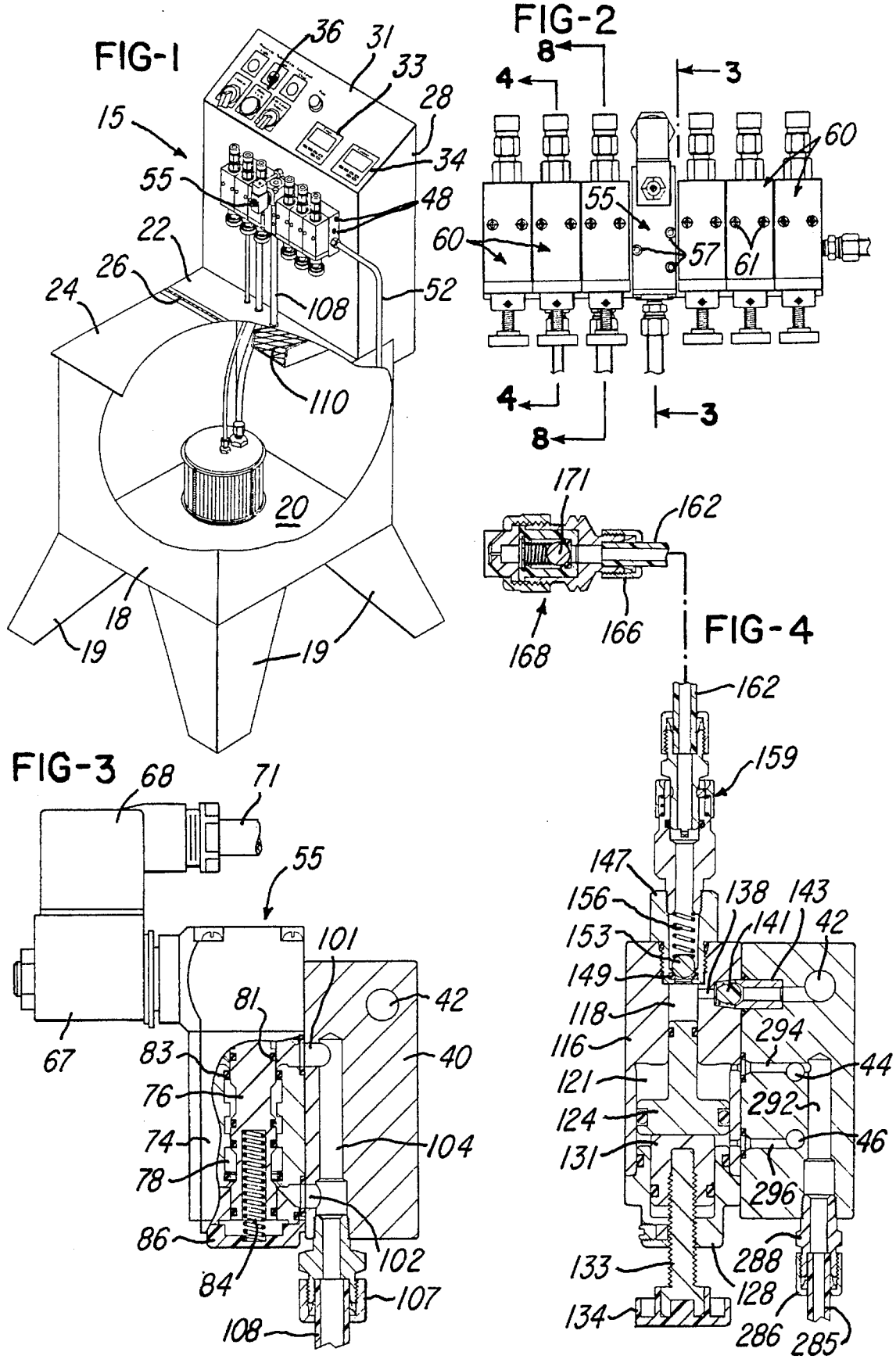

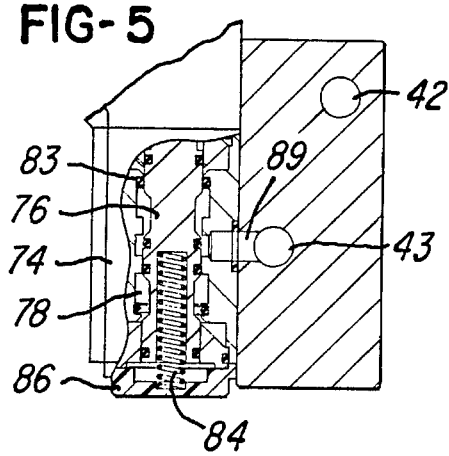
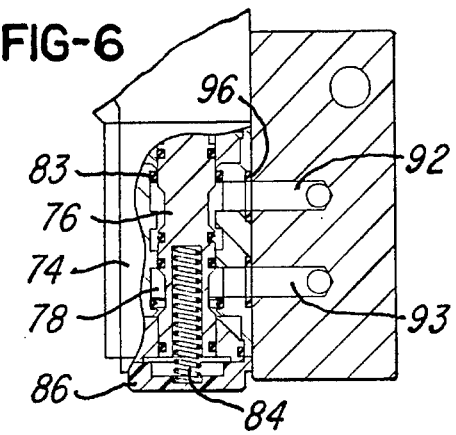
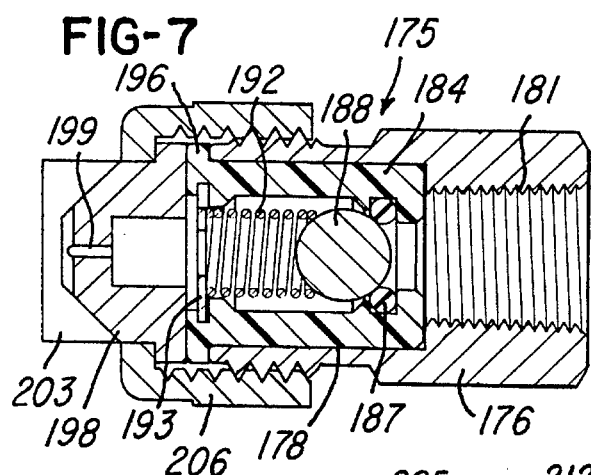
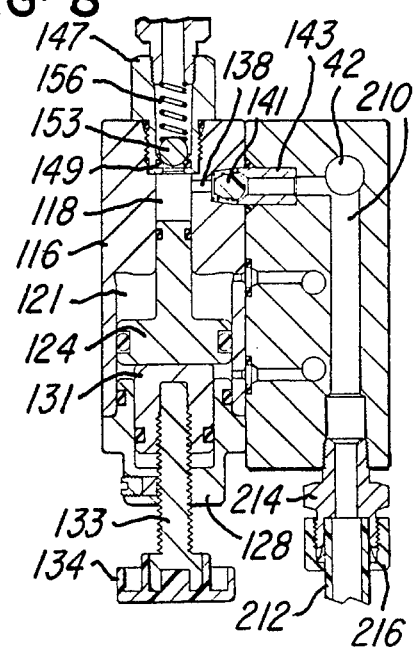
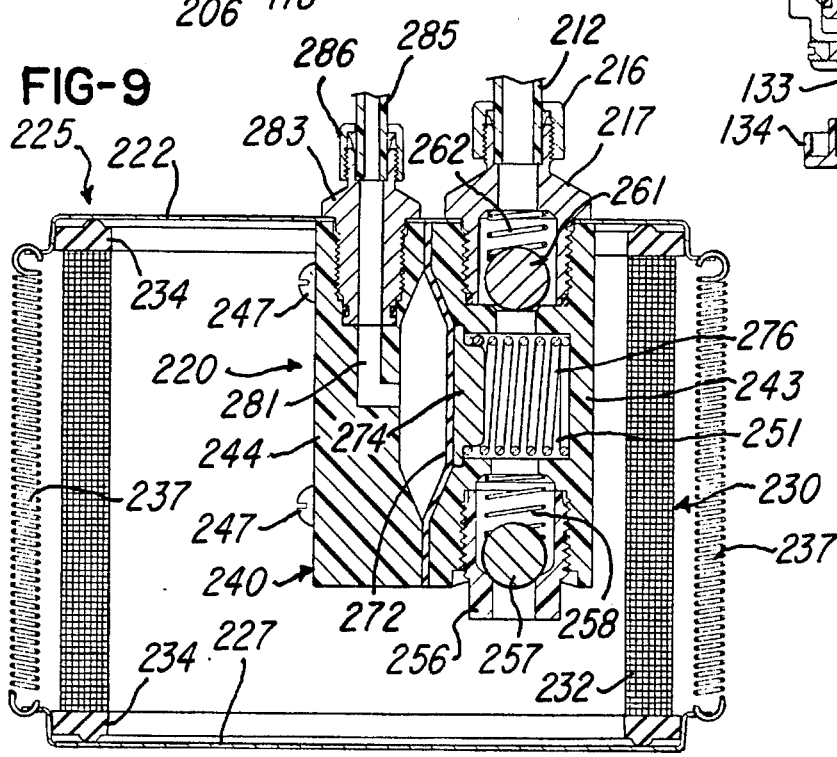

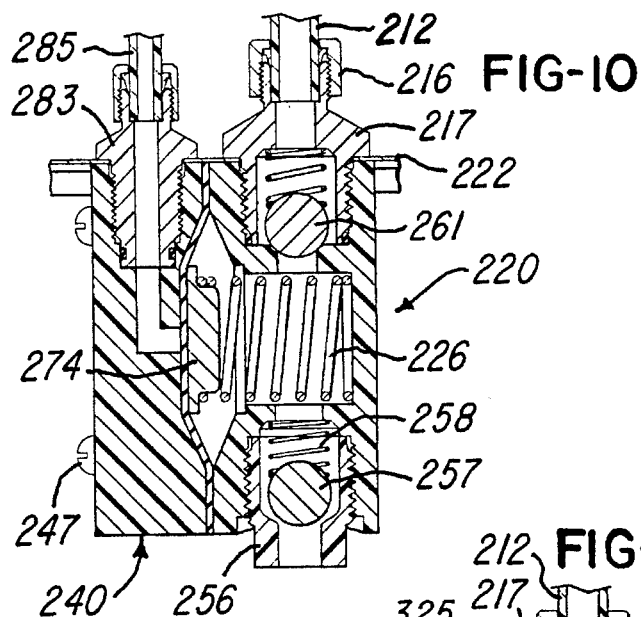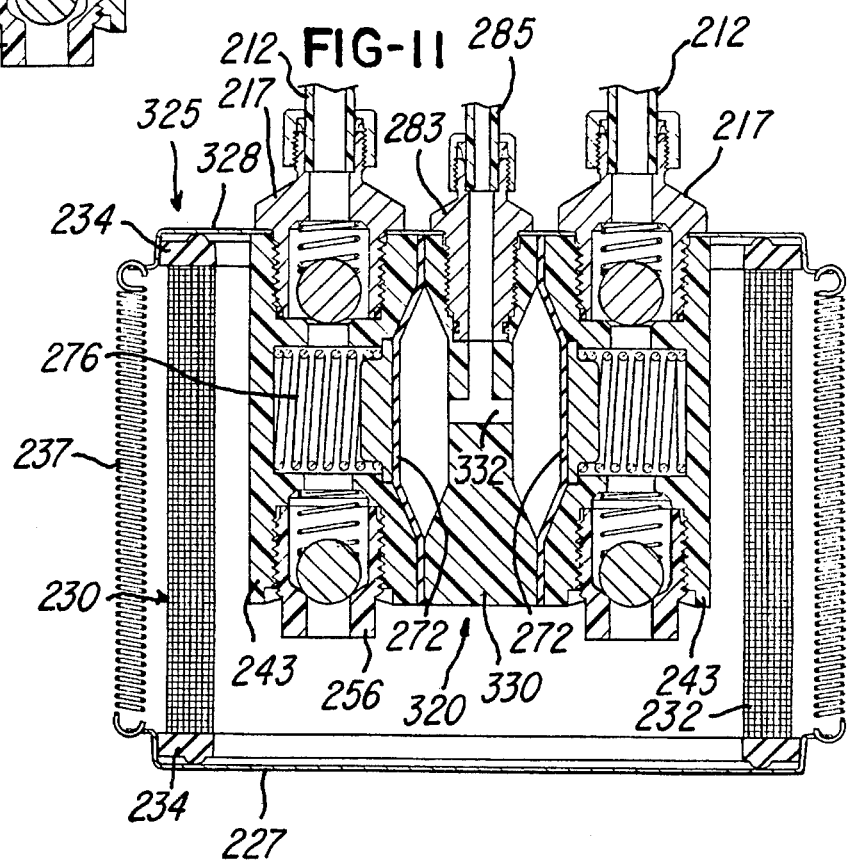

LIQUID DISTRIBUTING APPARATUS FOR LUBRICATING PARTS

BACKGROUND OF THE INVENTION

In the field of liquid distributing systems or apparatus commonly used for lubricating die parts in a mechanical press, for example, of the general type disclosed in U.S. Pat. Nos. 4,079,864 and 4,520,902, a plurality of independent air actuated ejector or distribution pumps receive a supply of oil or lubricating fluid from a common reservoir. Each of the distribution pumps is connected by a corresponding line to a component of the press or machine which requires lubrication. When the fluid distribution system is used for lubricating die components on a reciprocating press, a spray nozzle is connected to each distribution line for repetitively spraying lubricant onto the die component with each actuation of the corresponding distribution pump. Usually, the air actuated distribution pumps are operated in timed relation with the reciprocating press so that the lubricant is sprayed at the instant it is most effective, thereby conserving or minimizing the volume of lubricating fluid required to lubricate the die components.

It is known to supply the lubricating fluid to the distribution pumps from a supply container or reservoir. The reservoir may be located above the distribution pumps to provide a gravity flow to the pumps or a power operated supply pump is sometimes used on top of a reservoir container for pumping the lubricating fluid to the distribution pumps on demand when the pressure of the fluid within the supply line drops to a predetermined lower pressure. In a multiple point distribution system or apparatus of the type described above, it is desirable for the system to be able to handle and spray lubricating fluids having a wide range of viscosity, for example, ranging up to 1000 SUS at 100° F. It is also desirable for the system to be constantly primed and to be able to hold a substantial pressure, for example, 80 psi within the fluid pressure lines extending from the pumps to the nozzles between pump cycles in order to obtain a more uniform and evenly distributed spray pattern from each nozzle. It is also desirable for all of the distribution pumps to operate in unison and with each pump having an adjustable discharge volume in addition to providing for convenient assembly and disassembly for servicing or for changing the number of distribution pumps.

SUMMARY OF THE INVENTION

The present invention is directed to an improved liquid distributing system or apparatus which is ideally suited for use with a high speed reciprocating press and for repetitively discharging uniform preselected amounts of lubricant to multiple points or die components on the press. The apparatus provides all of the desirable advantages mentioned above and, in general, includes a solenoid actuated air control valve and a plurality of liquid distribution pumps removably mounted on a common manifold with the control valve in the center between the distribution pumps. Each of the distribution pumps has an air actuated reciprocating piston within a chamber having inlet and outlet ports with check valves, and lubricating fluid is supplied to the manifold and distribution pumps through a line connected to a supply pump also having an air actuated reciprocating diaphragm or piston. The solenoid valve also controls the supply pump in timed relation with the distribution pumps so that the system does not lose prime. Preferably, the supply pump is located within an annular filter unit submerged within a reservoir of lubricating fluid. A flexible line connects the outlet port of each distribution pump to a corresponding spray nozzle having a check valve formed by a valve body having a tubular plastic insert which confines a spring bias ball and a resilient annular seat for the ball.

Other features and advantages of the invention will be apparent from the following description, the accompanying drawings and the appended claims.

BRIEF DESCRIPTION OF THE DRAWINGS

FIG. 1 is a perspective view of a liquid distributing system or apparatus constructed in accordance with the invention and with a portion of a fluid reservoir tank broken away to show internal components;

FIG. 2 is an elevational view of the solenoid actuated air control valve and air actuated distribution pumps shown in FIG. 1;

FIG. 3 is a fragmentary section of the solenoid control valve, taken generally on the line 3—3 of FIG. 2;

FIG. 4 is a section of a typical distribution pump and the support manifold, taken generally on the line 4—4 of FIG. 2 and also showing a corresponding spray nozzle constructed in accordance with the invention;

FIG. 5 is a fragmentary section similar to FIG. 3 and showing the connection of the solenoid control valve with the supply passage;

FIG. 6 is a fragmentary section similar to FIG. 5 and showing the connection of the solenoid valve to the air distribution passages;

FIG. 7 is an enlarged axial section of the spray nozzle shown in FIG. 4;

FIG. 8 is a section of a distribution pump, similar to FIG. 4, and taken generally on the line 8—8 of FIG. 2;

FIG. 9 is a vertical section through the filter and enclosed air actuated supply pump shown in FIG. 1, and showing the pump in a pumping condition;

FIG. 10 is a section of the supply pump shown in FIG. 9 and with the pump shown in an unpressurized condition; and FIG. 11 is a vertical section similar to FIG. 9 and showing a double air actuated supply pump constructed in accordance with a modification of the invention.

DESCRIPTION OF THE PREFERRED EMBODIMENTS

FIG. 1 illustrates a lubrication unit or apparatus 15 constructed in accordance with the invention for distributing lubricating oil or fluid through multiple lines to selected points on a die set (not shown) mounted on a high speed reciprocating mechanical press. The lubricating unit 15 includes a fabricated sheet metal container or tank 18 supported by a set of formed sheet metal legs 19 and defining a reservoir chamber 20 for receiving a volume of the lubricating oil or fluid. The tank 18 is covered by a top wall 22 which is welded to the tank and a door or closure 24 which is pivotally connected to the wall 22 by a hinge 26. A fabricated sheet metal control box 28 is secured to the top wall 22 and has an inclined or sloping top wall 31 which supports certain instruments such as a timer 33 and a counter 34 in a set of control buttons and switches 36.

An elongated bar-like manifold 40 (FIGS. 3 and 4) is mounted on the front wall of the control box 28. The manifold has longitudinally extending passages 42 and 43 for receiving a supply of lubricating fluid and a supply of pressurized air, respectively, and two longitudinally extending passages 44 and 46 (FIGS. 4, 6 and 8) for alternating receiving pressurized air. As shown in FIG. 1, the outer ends of the passages 42, 46 and 44 are closed by plugs 48, and the outer end of the passage 43 is connected to a pressurized air supply line 52 which extends from an air compressor through an air filter unit (not shown).

As shown in FIG. 1, the manifold 40 supports a solenoid actuated control valve 55 which is centrically located on the manifold 40. The control valve 55 is removably secured to the manifold by a set of screws 57 (FIG. 2) and is centered between a set of six distribution pumps 60 (FIGS. 4 and 8) which are also removably mounted on the manifold 40 each by a pair of screws 61. The solenoid actuated control valve 55 (FIG. 3) includes a solenoid coil 67 which receives electrical power through a connector 68 which receives power from an electrical conductor 71 extending rearwardly into the electrical control box 28. The solenoid valve 55 also includes a valve body 74 which supports a valve member or spool 76 for reciprocating movement within a generally cylindrical valve chamber 78. The valve spool 76 carries a set of axial spaced O-rings 81, and the valve body 74 supports a set of axially spaced O-rings 83 which form fluid-tight seals between the valve spool 76 and valve body 74. A compression spring 84 extends within a bore within the valve spool 76 and engages a cap 86 for normally urging the valve spool 76 upwardly within the valve chamber 78 from the position (FIG. 3) of the valve spool 76 when the solenoid coil 67 is energized.

Referring to FIG. 5, aligned ports 89 within the valve body 74 and the manifold 40 connect the air supply passage 43 to a center portion of the valve chamber 78. When the valve spool 76 shifts or is reciprocated, the pressurized air within the passage 43 alternately shifts between the air passages 44 and 46 (FIG. 6) through corresponding connector ports 92 and 93 formed within the manifold 40 and valve body 74. A set of resilient O-rings 96 (FIG. 6) surround the ports 89, 92 and 93 and form air-tight seals between the valve body 74 and manifold 40.

As shown in FIG. 3, opposite end portions of the valve chamber 78 are connected by ports 101 and 102 to a vertical air exhaust passage 104 formed within the manifold 40 and connected by a fitting 107 to an air exhaust tube 108. As shown in FIG. 1, the air exhaust tube 108 extends downwardly from the manifold 40 into a chamber 110 which receives a muffler body or pad (not shown) of open cell plastics foam material.

Referring to FIG. 4, each of the distribution pumps 60 includes a pump body 116 which defines a fluid pump chamber 118 for receiving lubricating fluid and a larger diameter air chamber 121. A piston 124 is supported within the chambers 118 and 121 for axial movement and carries a set of resilient O-rings which form fluid-tight seals with the pump body 116. The bottom of the chamber 121 is closed by a cap member 128 which defines a bore for receiving a cylindrical stop member 131 mounted on the upper end portion of an adjustment screw 133. The screw 133 extends through a threaded hole within the cap 128 and has a head portion receiving a knob 134. As apparent, axial adjustment of the screw 133 with the knob 134 adjusts the vertical position of the stop member 131 for limiting the stroke of the piston 124 to adjust the maximum volume of the fluid chamber 118.

The chamber 118 has an inlet port 138 which extends to a spring bias check valve member 141 urged against a conical seat formed on one end of a tubular insert 143 which extends the inlet port 138 to the common fluid supply passage 42.

The fluid chamber 118 has an outlet port which receives a tubular check valve body or fitting 147 having an inner end portion defining an internal groove for receiving a resilient O-ring 149. A stainless steel or plastic ball 153 normally engages the O-ring seat 149 under the force exerted by a compression spring 156, and the check valve body or fitting 147 is connected by a quick connect coupling 159 to a flexible extruded plastic distribution tube or line 162. The distribution tube 162 for each distribution pump 60 may have a length of several feet, and all of tile tubes are omitted from FIG. 1 for the purpose of clarity. The outer end portion of each distribution tube 162 is connected by a compression fitting 166 (FIG. 4) to a corresponding spray nozzle 168 which includes a pressure responsive check valve 171.

FIG. 7 illustrates a spray nozzle 175 which is constructed in accordance with the invention and similar to the spray nozzle 168. The nozzle 175 includes a tubular body 176 defining a cylindrical bore 178 and a smaller threaded bore 181 for receiving a fitting which connects the nozzle 175 to the outer end portion of the distribution line 162. A tubular insert 184 is machined of a rigid plastics material and slides within the bore 178. The insert 184 has an inner end portion with an internal groove which receives and confines a resilient O-ring seat 187. A stainless steel or rigid plastic ball 188 is urged against the seat 187 by a compression spring 192 which extends from a spring retaining ring 193 expanded into an internal groove within the opposite end portion of the insert 184. The insert 184 also has an integrally machined and outwardly projecting flange 196 which engages the end of the body 176 and also an outwardly projecting flange of a conventional brass spray nozzle tip 198 having an orifice 199 within a slot 203 for producing a flat spray pattern. A tubular cap 206 is threadably connected to the body 176 and compresses the flange of the nozzle tip 198 against the flange 196 of the insert 184. The plastic flange 196 compresses sufficiently to form a positive fluid-tight seal between the nozzle tip 198 and the nozzle body 176 when the cap 206 is tightened.

Referring to FIGS. 8 and 9, lubricating oil or fluid is supplied to the common passage 42 within the manifold 40 through a vertical passage 210 which is connected to a flexible fluid supply tube 212 by a fitting 214 and compression nut 216. The fluid supply line or tube 212 extends through a hole within the top wall 22 (FIG. 1) of the reservoir tank 18 and has an opposite or lower end portion connected by another compression nut 216 to an outlet fitting 217 (FIG. 9) of a supply pump 220.

The supply pump 220 is supported by a circular top metal cover 222 of a filter unit 225 which is supported by the bottom wall of the reservoir tank 18. The top wall 222 and a circular sheet metal bottom wall 227 confined therebetween a cylindrical filter media 230 formed by a zig-zag or pleated stainless steel wire mesh 232 having opposite end portions embedded within corresponding molded plastic sealing rings 234. The filter screen 230 and rings 234 form a filter cartridge which is sandwiched between the upper wall 222 and bottom wall 227, and a series of circumferentially spaced and axially extending tension springs 237 connect outwardly projecting flanges on the walls 222 and 227 to secure the walls to the filter cartridge.

The supply pump 220 (FIG. 9) includes a plastic cylindrical pump body 240 formed by mating sections 243 and 244 secured together by a set of four screws 247. The pump body 243, defines a fluid pumping chamber 251 which has an inlet defined by a plastic inlet fitting 256 threaded into the body section 243 and defining a seat for receiving a ball 257 urged against the seat by a compression spring 258 to form a one way check valve. The outlet fitting 217 is also threaded into the pump body section 243 and forms an outlet for the chamber 251. The fitting 217 confines a ball 261 and a compression spring 262 which normally urges the ball 261 against an annular seat formed within the pump body section 243 to form another one way check valve.

A circular flexible diaphragm 272 is formed of rubber or a rubber-like material and has a peripheral portion confined between the pump body sections 243 and 244. A flanged button 274 is positioned on the center portion of the diaphragm 272 and projects into the pump chamber 251 to receive one end portion of a compression spring 276. The spring 276 normally urges the diaphragm 272 against the pump body section 244 which defines an air passage 281 extending into a fitting 283 threaded into the pump body section 244. As shown in FIG. 9, the fittings 217 and 283 secure the fluid supply pump 220 to the top metal wall 222 of the filter unit 225 and support the pump 220 within the filter unit 225.

The fitting 283 (FIG. 9) receives one end portion of a flexible air pressure line 285 which is secured to the fitting by a compression nut 286. The air pressure line 285 extends through a hole within the top wall 22 (FIG. 1) of the tank 18 and is connected by another compression nut 286 to a tubular fitting 288 (FIG. 4) threaded into the manifold 40. An air passage 292 (FIG. 4) extends vertically within the manifold 40 and forms an extension of the air pressure line 285 to the longitudinally extending air passage 44 within the manifold 40. Another air passage 294 (FIG. 4) connects the common air passage 44 to the upper end of the air chamber 121 for each distribution pump 60, and a similar air passage 296 connects the lower end of the chamber 121 of each pump 60 to the common air passage 46 within the manifold 40.

In operation of the lubricant distribution system 15 described above in connection with FIGS. 1–9, the coil 67 of the solenoid control valve 55 is energized in timed relation with the operation of the reciprocating press, for example, so that the coil 67 is energized with each stroke of the press. When the coil 67 is energized, the valve spool 76 moves down to its lower position (FIGS. 3, 5 and 6) so that pressurized air within the common air supply passage 43 within the manifold 40 is supplied to the passage 44 through the passage 294 (FIG. 6). When the passage 44 is pressurized with air, the pressurized air is directed through the passage 292 (FIG. 4) and air pressure line 285 to the diaphragm actuated fluid supply pump 220 so that the diaphragm is shifted to the right (FIG. 9). This causes lubricating fluid within the chamber 251 to close the check valve within the inlet fitting 256 and open the check valve within the outlet fitting 217. The pressurized fluid is forced upwardly through the tube or line 212 and through the passage 210 (FIG. 8) to the common fluid supply passage 42 which supplied fluid to all of the chambers 118 (FIG. 4) through the corresponding inlet check valves 141. Preferably the fluid is supplied to the fluid supply line 212 and all of the chambers 118 at a pressure within the range of 30 to 60 psi.

When the common air passage 44 receives pressurized air from the passage 43 through the passage 92, the pressurized air is also supplied to the upper end of each of the air chambers 121 (FIG. 4) within all of the distribution pumps 60 so that the pistons 124 are forced downwardly against the corresponding adjustable stops 131. Also, when the solenoid valve 55 is energized and the valve spool 76 is in its lower position (FIG. 3), the common air passage 46 within the manifold 40 is connected to the exhaust line 108 through the passage 93 (FIG. 6) and the passage 102 (FIG. 3) by the valve spool 76. When the air passage 46 is connected to the exhaust line, the lower ends of all the air chambers 121 within all of the distribution pump 60 are connected to exhaust so that pistons 124 are free to move downwardly and seat on the adjustable plungers 131 without compressing air within the lower portions of the chambers 121.

When the coil 67 of the solenoid valve is deenergized, the valve spool 76 shifts upwardly (not shown) by the spring 84 so that the common air supply passage 43 (FIG. 5) is connected to the common passage 46 within the manifold 40, and the common air passage 44 is connected to the exhaust line 108 through the passages 92 (FIG. 6) 101 and 104 (FIG. 3). When the passage 46 receives the pressurized air, the pressurized air is fed to the lower ends of all of the piston chambers 121 through the corresponding passages 296 (FIG. 4). This causes all of the pistons 124 to shift upwardly to displace the lubricating fluid within the chambers 118 into the corresponding fluid distribution lines 162.

As the above cycle is repeated, the fluid pressure within the lines 162 (FIG. 4) is maintained at a pressure of about 80 psi as a result of the check valves within the fittings 147 and spray within the nozzles 175. When the fluid pressure exceeds 80 psi, the check valves within the spray nozzles 175 (FIG. 7) open and the fluid is discharged in a spray pattern from the orifices 199 of the spray nozzles. The connection of the common passage 44 to the exhaust line 108 also exhausts the upper portions of all of the piston chambers 121 (FIG. 4) and also exhausts the air chamber on the left side of the diaphragm 272 within the supply pump 220 (FIG. 9). When the left side of the diaphragm 272 is exhausted, the compression spring 276 shifts the diaphragm 272 to the left (FIG. 10). The expansion of the pump chamber 251 is effective to close the upper check valve within the fitting 217, and fluid is sucked into the pump chamber 251 through the inlet fitting 256 and pass the check valve within the fitting.

Referring to FIG. 11, when ten or more of the fluid distribution pumps 60 are mounted on a manifold longer than the manifold 40, a larger fluid supply pump is sometimes required. This is accomplished by providing a double diaphragm fluid supply pump 320 (FIG. 11). The pump is constructed similar to the supply pump 220 and is supported within a filter unit 325 which is constructed substantially the same as the filter unit 225 but with a top cover or end wall 328 having three circular holes instead of two circular holes.

The fluid supply pump or pump assembly 320 includes two of the pump sections 243 and two diaphragms 272 which are clamped together on opposite sides of a cylindrical center body section 330 having an inverted T-shaped air passage 332 for simultaneously pressurizing both of the diaphragms 272. Since all the remaining components of the pump assembly 320 are the same as described above in connection with the pump assembly 220, the same reference numbers are used for the same pump components. In addition, the two fluid supply tubes 212 are connected to the elongated manifold (not shown) and to the common fluid passage 42 through two longitudinally spaced fluid passages 210.

From the drawings and the above description, it is apparent that a liquid lubricating or distribution system or apparatus constructed in accordance with the invention, provides desirable features and advantages. One important feature is provided by the operation of the liquid supply pump 220 or 320 in timed relation with all of the injector or distribution pumps 60. This assures that all of the fluid chambers 118 within the distribution pumps 60 receive fluid under pressure when the injector pistons 124 are descending so that a minimum pressure of 30 to 60 psi is maintained on the fluid within all of the distribution lines 162 extending from all of the distribution pump 60.

The pressurized lubricating fluid supplied to the chambers 118 also cooperates with the check valves within the nozzles 168 or 175 and within the fittings 147 to assure that the distribution lines 162 maintain a substantial fluid pressure during the downward strokes of the pump pistons 124. As a result, the fluid distribution system is capable of handling lubricating fluids having a wide range of viscosities including highly viscous fluids. The individual or modular distribution pumps 60 are also conveniently replaceable on the common support manifold 40, and the centrally located solenoid control valve 55 provides for uniform operation of the distribution pumps 60. The diaphragm actuated fluid supply pump 220 or 320 also provides for dependable operation and is conveniently located within the filter unit 225 or 325. Thus when the filter unit is submerged within a fluid supply, the supply pump is automatically submerged within the fluid.

While the forms of fluid distribution apparatus herein described constitute preferred embodiments of the invention, it is to be understood that the invention is not limited to these precise forms of apparatus, and that changes may be made therein without departing from the scope and spirit of the invention as defined in the appended claims.

The invention having thus been described, the following is claimed:

1. Apparatus adapted for repetitively distributing a predetermined amount of lubricating fluid to at least one point on a metal forming press, comprising at least one distribution pump including a body defining a pump chamber having an inlet and an outlet with corresponding check valves, an air actuated reciprocating piston within said chamber, a distribution line connecting said outlet to a discharge nozzle having a check valve, a fluid supply line connecting said inlet to an air actuated fluid supply pump including a body defining a pump chamber having an inlet and an outlet with corresponding check valves, an air actuated reciprocating piston within said supply pump chamber, said inlet of said supply pump chamber connected to receive a supply of fluid, an air controller connected to operate said piston of said fluid supply pump and said piston of said distribution pump in timed relation, and said controller including means for moving said piston in said supply pump in a direction to supply lubricating fluid to said distribution pump and for simultaneously moving said piston in said distribution pump in a direction for receiving the fluid from said supply pump for maintaining the fluid in said distribution line at a substantial minimum pressure.

2. Apparatus as defined in claim 1 wherein said air controller comprises a solenoid actuated air control valve, and means forming a series of passages connecting said control valve to said distribution pump and said fluid supply pump for simultaneously reciprocating said pistons of said pumps.

3. Apparatus as defined in claim 1 and including an annular filter unit adapted to be positioned within a fluid reservoir chamber, and said fluid supply pump is located within said filter unit.

4. Apparatus as defined in claim 3 wherein said filter unit comprises a cylindrical filter media having ends covered by closure plates, one of said plates supporting said supply pump, and a set of tension springs connecting said closure plates for clamping said plates against said ends of said filter media.

5. Apparatus as defined in claim 3 where in said reciprocating piston within said supply pump comprises a flexible diaphragm.

6. Apparatus as defined in claim 1 and including a plurality of said distribution pumps aligned in a row, an elongated manifold connected to all of said distribution pumps, and a series of longitudinally and laterally extending passages within said manifold for supplying pressurized air and fluid to each of said distribution pumps.

7. Apparatus as defined in claim 1 wherein said discharge nozzle comprises a tubular body, a nozzle spray tip removably secured to said body, said nozzle check valve including a tubular plastic insert within said body and having an internal annular groove retaining a resilient annular seat member, and a spring biased valve member within said insert and engaging said annular seat in a closed position.

8. Apparatus as defined in claim 7 wherein said tubular plastic insert includes an outwardly projecting integral flange disposed between said nozzle body and said nozzle spray tip, and said flange forms a fluid-tight seal between said nozzle body and said nozzle spray tip.

9. Apparatus adapted for repetitively distributing a predetermined amount of lubricating fluid to a plurality of point on a metal forming press, comprising a plurality of distribution pumps each including a body defining a pump chamber having an inlet and an outlet with corresponding check valves, an air actuated reciprocating piston within said chamber of each said body, a distribution line connecting said outlet of each said pump body to a corresponding discharge nozzle having a check valve, a fluid supply line connecting said inlet of each said pump body to an air actuated fluid supply pump including a body defining a pump chamber having an inlet and an outlet with corresponding check valves, an air actuated reciprocating piston within said supply pump chamber, said inlet of said supply pump chamber connected to receive a supply of fluid, an air controller connected to operate said piston of said fluid supply pump and said piston of each said distribution pump in timed relation, and said controller including means for moving said piston in said supply pump in a direction to supply lubricating fluid to each said distribution pump and for simultaneously moving said piston in each said distribution pump in a direction for receiving the fluid from said supply pump for maintaining the fluid in each said distribution line at a substantial minimum pressure.

10. Apparatus as defined in claim 9 wherein said air controller comprises a solenoid actuated air control valve, and an elongated manifold supporting said distribution pumps and defining a series of passages connecting said control valve to each of said distribution pumps and to said fluid supply pump for simultaneously reciprocating said pistons of all of said pumps.

11. Apparatus as defined in claim 10 wherein said air control valve is supported by a center portion of said manifold between two of said distribution pumps.

12. Apparatus as defined in claim 9 and including an annular filter unit adapted to be positioned within a fluid reservoir chamber, and said fluid supply pump is located within said filter unit.

13. Apparatus as defined in claim 12 wherein said filter unit comprises a cylindrical filter media having opposite ends covered by closure plates, one of said plates supporting said supply pump, and a set of tension springs connecting said closure plates for clamping said plates against said ends of said filter media.

14. Apparatus as defined in claim 12 wherein said reciprocating piston within said supply pump comprises at least one flexible diaphragm.

15. Apparatus as defined in claim 9 wherein said fluid supply pump comprises double diaphragm actuated pump.

16. Apparatus as defined in claim 9 and including an elongated manifold connected to all of said distribution pumps, and a series of longitudinally and laterally extending passages within said manifold for supplying pressurized air and fluid to each of said distribution pumps.

17. Apparatus as defined in claim 9 wherein each of said discharge nozzles comprises a tubular body, a nozzle spray tip removably secured to said body, said nozzle check valve including a tubular plastic insert within said body and having an internal annular groove retaining a resilient annular seat member, and a spring biased valve member within said insert and engaging said annular seat in a closed position.

18. Apparatus as defined in claim 17 where in said tubular plastic insert within each said nozzle includes an outwardly projecting integral flange disposed between said nozzle body and said nozzle spray tip, and said flange forms a fluid-tight seal between said nozzle body and said nozzle spray tip.

19. Apparatus adapted for repetitively distributing a predetermined amount of lubricating fluid to at least one point on a metal forming press, comprising at least one distribution pump including a body defining a pump chamber having an inlet and an outlet with corresponding check valves, an air actuated reciprocating piston within said chamber, a distribution line connecting said outlet to a discharge nozzle having a check valve, a fluid supply line connecting said inlet to an air actuated fluid supply pump including a body defining a pump chamber having an inlet and an outlet with corresponding check valves, an annular filter unit adapted to be positioned within a fluid reservoir chamber and enclosing said fluid supply pump, an air actuated reciprocating piston within said supply pump chamber, said inlet of said supply pump chamber positioned within said filter unit to receive a supply of fluid, an air controller including a solenoid actuated air control valve, a series of passages connecting said control valve to said distribution pump and to said fluid supply pump, and said controller including means for moving said piston in said supply pump in a direction to supply lubricating fluid to said distribution pump and for simultaneously moving said piston in said distribution pump in a direction for receiving the fluid from said supply pump for maintaining the fluid in said distribution line at a substantial minimum pressure.

20. Apparatus as defined in claim 19 wherein said filter unit comprises a cylindrical filter media having ends covered by closure plates, one of said plates supporting said supply pump, and a set of tension springs connecting said closure plates for clamping said plates against said ends of said filter media.

21. Apparatus as defined in claim 19 wherein said reciprocating piston within said supply pump comprises a flexible diaphragm.

22. Apparatus as defined in claim 19 and including a plurality of said distribution pumps aligned in a row, an elongated manifold connected to all of said distribution pumps, and a series of longitudinally and laterally extending passages within said manifold for supplying pressurized air and fluid to each of said distribution pumps.

23. Apparatus adapted for repetitively distributing a predetermined amount of lubricating fluid to at least one point on a metal forming press, comprising at least one distribution pump including a body defining a pump chamber having an inlet and an outlet with corresponding check valves, an air actuated reciprocating piston within said chamber, a distribution line connecting said outlet to a discharge nozzle having a check valve, a fluid supply line connecting said inlet to a fluid supply, said discharge nozzle including a tubular body, a nozzle spray tip removably secured to said body, said nozzle check valve including a tubular plastic insert within said body and having an internal annular groove retaining a resilient annular seat member, and a spring biased valve member within said insert and engaging said annular seat in a closed position.

24. Apparatus as defined in claim 23 wherein said tubular plastic insert includes an outwardly projecting integral flange disposed between said nozzle body and said nozzle spray tip, and said flange forms a fluid-tight seal between said nozzle body and said nozzle spray tip.

* * * * *